(12) United States Patent
Horst

(10) Patent No.: US 10,744,925 B1
(45) Date of Patent: Aug. 18, 2020

(54) TRUCK BED LOAD ORGANIZER

(71) Applicant: Michael Horst, Cedar City, UT (US)

(72) Inventor: Michael Horst, Cedar City, UT (US)

( * ) Notice: Subject to any disclaimer, the term of this patent is extended or adjusted under 35 U.S.C. 154(b) by 0 days.

(21) Appl. No.: 16/194,730

(22) Filed: Nov. 19, 2018

(51) Int. Cl.
*B60P 7/14* (2006.01)
*B60P 1/00* (2006.01)

(52) U.S. Cl.
CPC ................. *B60P 7/14* (2013.01); *B60P 1/003* (2013.01)

(58) Field of Classification Search
CPC .................................. B60P 7/14; B60P 1/003
USPC ...... 296/24.3, 24.4, 24.44, 181.7, 37.5, 37.6; 410/118, 129
See application file for complete search history.

(56) References Cited

U.S. PATENT DOCUMENTS

| | | | | |
|---|---|---|---|---|
| 1,508,029 A * | 9/1924 | Segal | ................. | E05C 1/04 292/57 |
| 1,593,684 A * | 7/1926 | Anakin | ................. | E05C 1/04 70/128 |
| 3,222,099 A | 12/1965 | Frode | | |
| 4,750,773 A * | 6/1988 | Chapline | ................. | B60R 11/06 296/37.5 |
| 4,938,398 A * | 7/1990 | Hallsen | ................. | B60R 9/00 224/404 |
| D374,423 S * | 10/1996 | Downey, II | ................. | D12/423 |
| 5,853,116 A * | 12/1998 | Schreiner | ................. | B60R 9/00 224/404 |
| 6,007,283 A * | 12/1999 | Labeur | ................. | B60R 21/06 410/100 |
| 6,302,465 B1 * | 10/2001 | Faber | ................. | B60P 1/003 296/39.1 |
| 6,308,873 B1 * | 10/2001 | Baldas | ................. | B60R 7/02 217/15 |
| 6,616,389 B1 * | 9/2003 | Ament | ................. | B60R 7/005 410/100 |
| 6,644,710 B2 * | 11/2003 | Seel | ................. | B60R 7/02 224/497 |
| 6,845,875 B2 * | 1/2005 | Grattan | ................. | A47C 17/80 220/4.22 |
| 6,886,713 B1 * | 5/2005 | Scherrer | ................. | B60R 11/06 220/817 |
| 6,886,876 B1 * | 5/2005 | Damian | ................. | B60R 9/00 224/404 |
| 6,986,541 B1 * | 1/2006 | Haack | ................. | B62D 33/02 224/404 |
| 7,017,977 B1 * | 3/2006 | Kelter | ................. | B60P 7/135 296/182.1 |
| 7,048,320 B2 * | 5/2006 | Rubel | ................. | B60R 7/02 296/37.6 |
| 7,270,360 B2 * | 9/2007 | Frasure | ................. | B60R 9/00 224/403 |

(Continued)

*Primary Examiner* — Hilary L Gutman
(74) *Attorney, Agent, or Firm* — Sanchelima & Associates, P.A.; Christian Sanchelima; Jesus Sanchelima

(57) ABSTRACT

The present invention is an organizer to be installed in a truck bed of a vehicle. The organizer includes a rectangular base plate. The organizer also includes a first rear plate and a second rear plate hingedly coupled to a rear edge of the base plate. The first rear plate and the second rear plate are arranged side-by-side along a length of rear edge of the base plate. The organizer further includes one or more means for constraining the first rear plate and the second rear plate either relative to each other or to the truck bed for disposing the first rear plate and the second rear plate in open position and closed position independent of each other.

6 Claims, 5 Drawing Sheets

(56) References Cited

U.S. PATENT DOCUMENTS

| | | | | |
|---|---|---|---|---|
| 7,731,462 | B2 * | 6/2010 | Squyres | B60P 7/14 410/129 |
| 8,215,693 | B2 * | 7/2012 | Ulita | B60R 7/02 296/37.1 |
| 8,348,325 | B2 * | 1/2013 | Hausler | B62D 33/0273 296/51 |
| 8,544,708 | B2 * | 10/2013 | Maimin | B60J 7/141 224/404 |
| D713,323 | S * | 9/2014 | Gearner, III | D12/414.1 |
| 9,988,103 | B1 * | 6/2018 | Mouch | B62D 33/0273 |
| 10,399,505 | B1 * | 9/2019 | Brackman | B65D 7/24 |
| 2004/0069825 | A1 * | 4/2004 | Delgado | B60R 9/00 224/404 |
| 2008/0315608 | A1 * | 12/2008 | Heller | B60P 7/14 296/50 |
| 2009/0096239 | A1 * | 4/2009 | Martin | B60R 9/00 296/37.6 |
| 2010/0264180 | A1 * | 10/2010 | Allotey | B60R 9/00 224/404 |
| 2012/0112487 | A1 * | 5/2012 | Wilson | B60R 9/065 296/37.6 |
| 2012/0181810 | A1 * | 7/2012 | Alvarino | B60R 13/01 296/39.2 |
| 2013/0249232 | A1 * | 9/2013 | Dinger | B60R 7/02 296/37.5 |
| 2014/0015271 | A1 * | 1/2014 | Demma | B60R 5/045 296/24.44 |
| 2015/0084360 | A1 * | 3/2015 | Mueller | B60R 5/006 296/37.5 |
| 2015/0165979 | A1 * | 6/2015 | Huebner | B60R 5/045 296/37.5 |
| 2016/0031383 | A1 * | 2/2016 | Squicciarini | B60R 5/04 224/281 |
| 2016/0121801 | A1 * | 5/2016 | Masih | B60R 9/06 296/37.6 |
| 2017/0120811 | A1 * | 5/2017 | Salter | B60C 3/06 |
| 2019/0001896 | A1 * | 1/2019 | Cinto | B60R 7/005 |
| 2019/0077320 | A1 * | 3/2019 | Tena Han | B60R 5/04 |
| 2019/0077321 | A1 * | 3/2019 | Baranowski | B65D 11/1826 |
| 2019/0232875 | A1 * | 8/2019 | Flores Marin | B60R 5/045 |
| 2019/0375339 | A1 * | 12/2019 | Colarossi | B60R 11/00 |

* cited by examiner

TRUCK BED LOAD ORGANIZER

BACKGROUND OF THE INVENTION

1. Field of the Invention

The present disclosure generally relates to truck beds as present in pickup trucks and the like and, more particularly, to an organizer for organizing and stabilizing loads arranged in the truck beds.

2. Description of the Related Art

Pickup trucks are becoming ever more popular as a vehicle of choice in the United States and elsewhere. Pickup trucks are used as work vehicles for carrying required equipment and transporting materials, including routine items, some of which are required to be permanently stored in truck bed. Pickup trucks are more popularly used for traversing rugged terrains and the like. However, while traversing on rugged terrains, the stored items could start sliding and rolling around within the wide-open truck bed, since such beds are generally designed for holding or stabilizing granular cargo loads, as opposed to miscellaneous solid cargo loads. This could result in damage to the stored items as well as possibly affect the structural integrity of the truck bed itself. Further, this could result in loud banging noises from loosely carried items sliding or rolling around inside the truck bed which could be irritating for the driver and any passengers in the truck.

Some arrangements have been developed for stabilizing loads on the beds of trucks and/or trailers. However, most of the known arrangements are concerned with holding or stabilizing granular cargo loads, as opposed to solid cargo loads, such as packages, implements, and the like. In other example, straps or ropes are most commonly used for holding load elements in place. However, such arrangements are, obviously, not always convenient and are not always satisfactory. Furthermore, bins and totes may be used for organizing the stored items, but are themselves prone to sliding and rolling when the truck traverses on rugged terrains, and thus still does not solve the problem.

U.S. Pat. No. 3,222,099 (hereinafter referred to as '099 patent) discloses a transport vehicle comprising a lower platform supported from its chassis and having vertical hinged side flaps disposed around said lower platform, horizontal floor flaps hinged on shafts extending transversely of the vehicle, said floor flaps. constituting an upper platform, substantially parallelepipedal fluid containers of flexible material folded down between said platforms, said hinged floor flaps covering said containers each of said containers having a bottom wall secured to said lower platform and said side flaps and floor flaps in folded-up position supporting the side walls of said containers when filled with fluid.

The '099 patent provides that truck cargo area could be divided by transversely extending partitions. The '099 patent also discloses a foldable side. The partitions are hinged so that they may be folded downwardly or pivoted upwardly. The foldable sides, together with the partitions, divide cargo space primarily for carrying fluids or the like. Containers are secured to the partitions so that when the partitions are in their upwardly extending positions, the containers are in their open position so as to receive fluids or the like. But such arrangement is complex and is not easily retrofittable. Moreover, the disclosed arrangement of the '099 patent is fixed and thus cannot be adjusted to store items of varying sizes, and is thus not suitable for transporting large equipment and the like.

Documents describing the closest subject matter provide for a number of more or less complicated features that fail to solve the problems described above in an efficient and economical way. None of the documents suggest the novel features of the present invention.

SUMMARY OF THE INVENTION

It is one of the main objectives of the present invention to provide an organizer to be installed in a truck bed of a pickup truck or the like for organized storing of items therein.

It is another objective of the present invention to provide an organizer which could be transformed into different configurations so as to adjust and accommodate boxes of varying sizes in the truck bed.

It is still another objective of the present invention to provide an organizer which prevents damage to the truck bed from rolling and sliding of items therein, as well as from exposure.

It is yet another objective of the present invention to provide an organizer which is inexpensive, durable, easy to adjust, easy to install and further easy to manufacture.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments.

It shall be noted that unless the context clearly requires otherwise, throughout the description, the words "comprise," "comprising," "include," "including," and the like are to be construed in an inclusive sense as opposed to an exclusive or exhaustive sense; that is to say, in the sense of "including, but not limited to." Words using the singular or plural number also include the plural or singular number, respectively while adhering to the concepts of the present invention. Furthermore, references to "one embodiment" and "an embodiment" are not intended to be interpreted as excluding the existence of additional embodiments that also incorporate the recited features.

Figure 1:
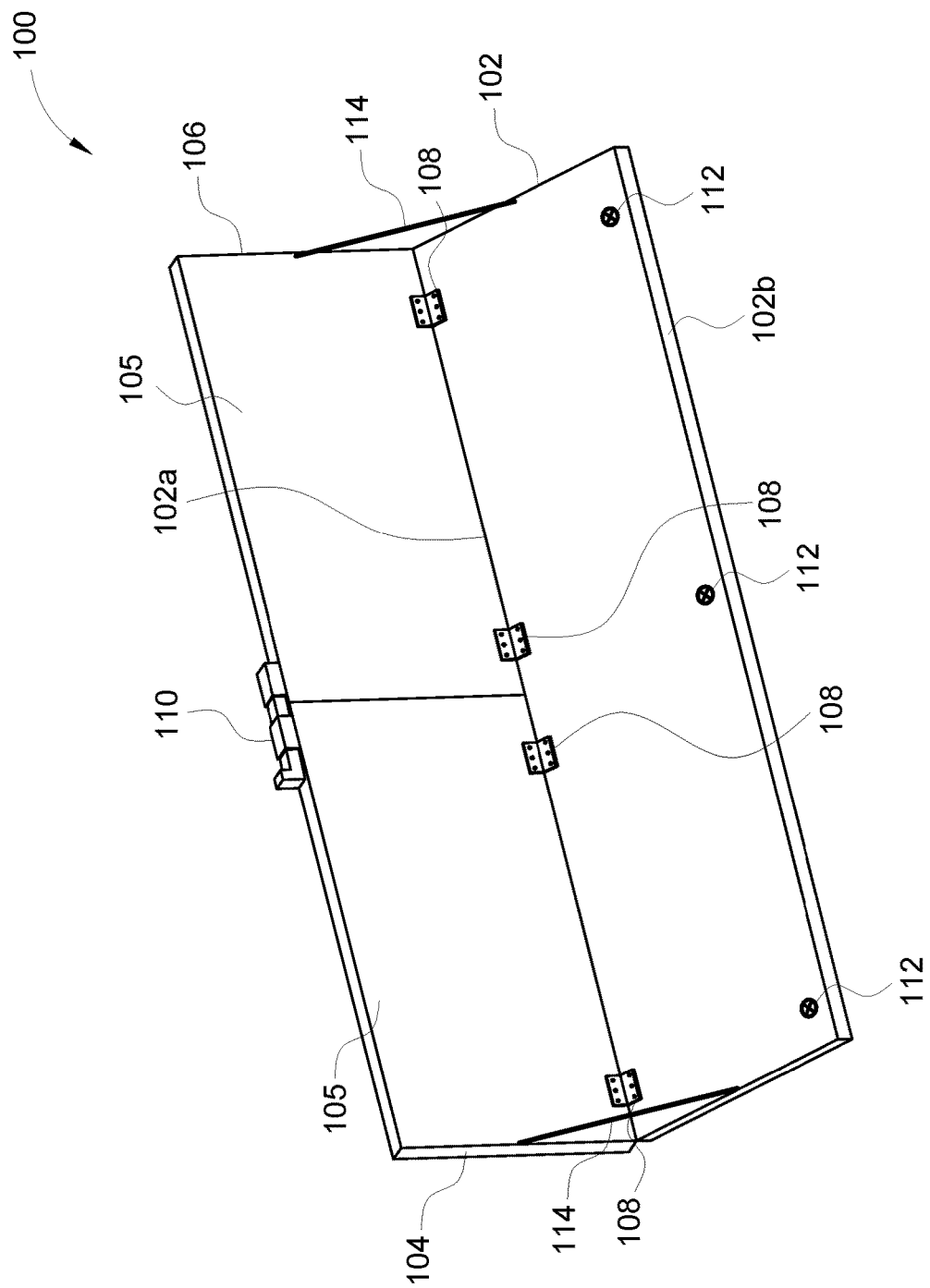
FIG. 1 illustrates a diagrammatic view of an organizer 100 in open position, in accordance with one or more embodiments of the present invention.
Figure 2:
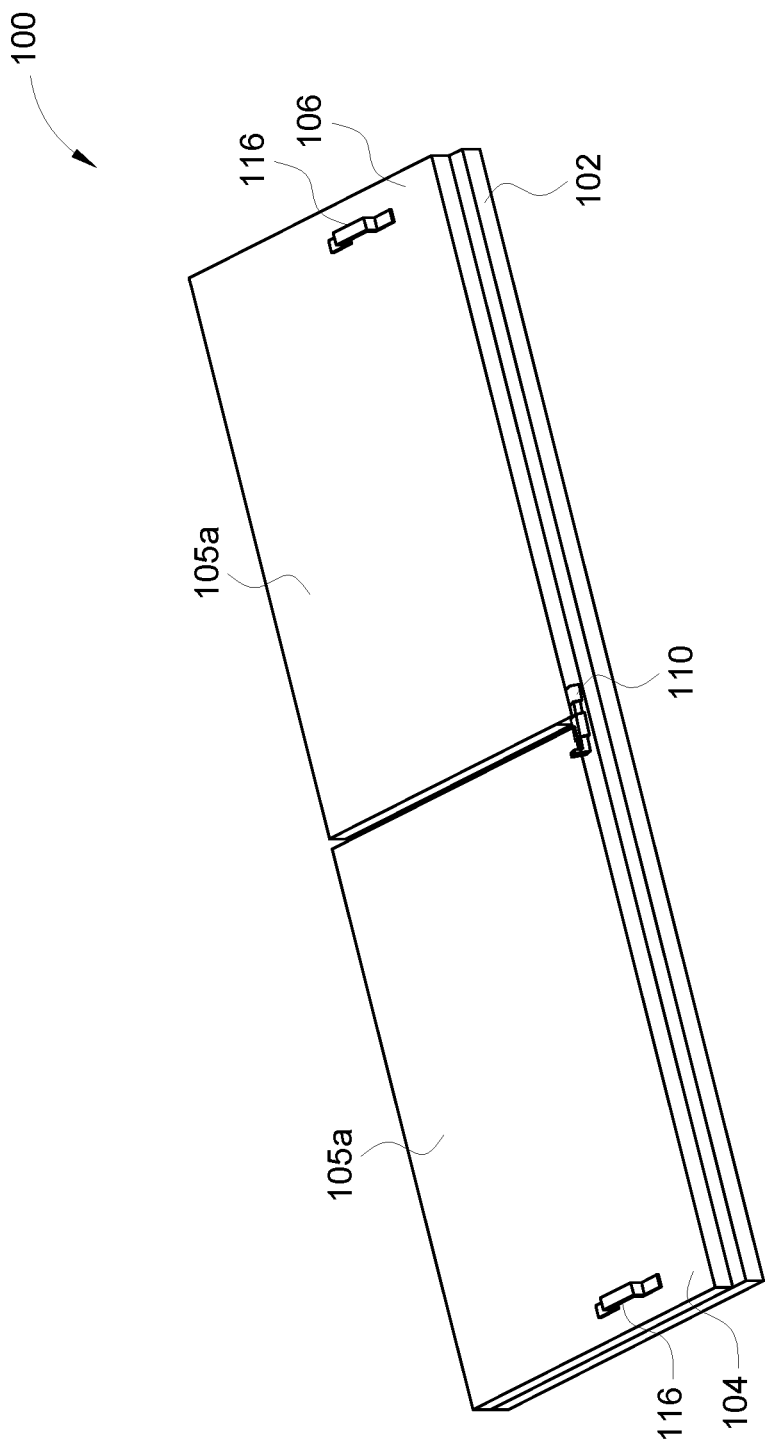
FIG. 2 illustrates a diagrammatic view of the organizer 100 in closed position, in accordance with one or more embodiments of the present invention.
Figure 3:
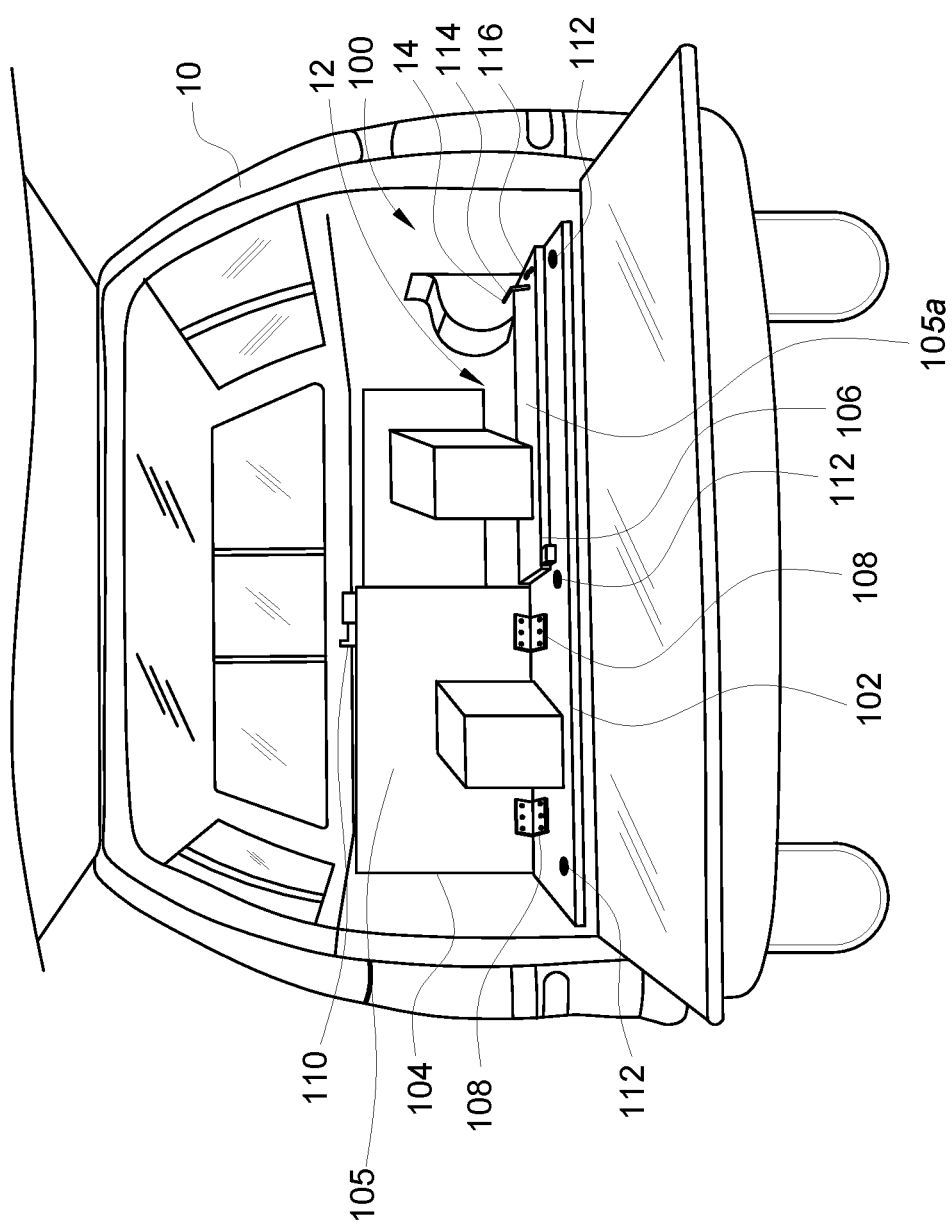
FIG. 3 illustrates a diagrammatic view of the organizer 100 installed in a truck bed 12 while disposed in partially open position, in accordance with one or more embodiments of the present invention.
Figure 4:
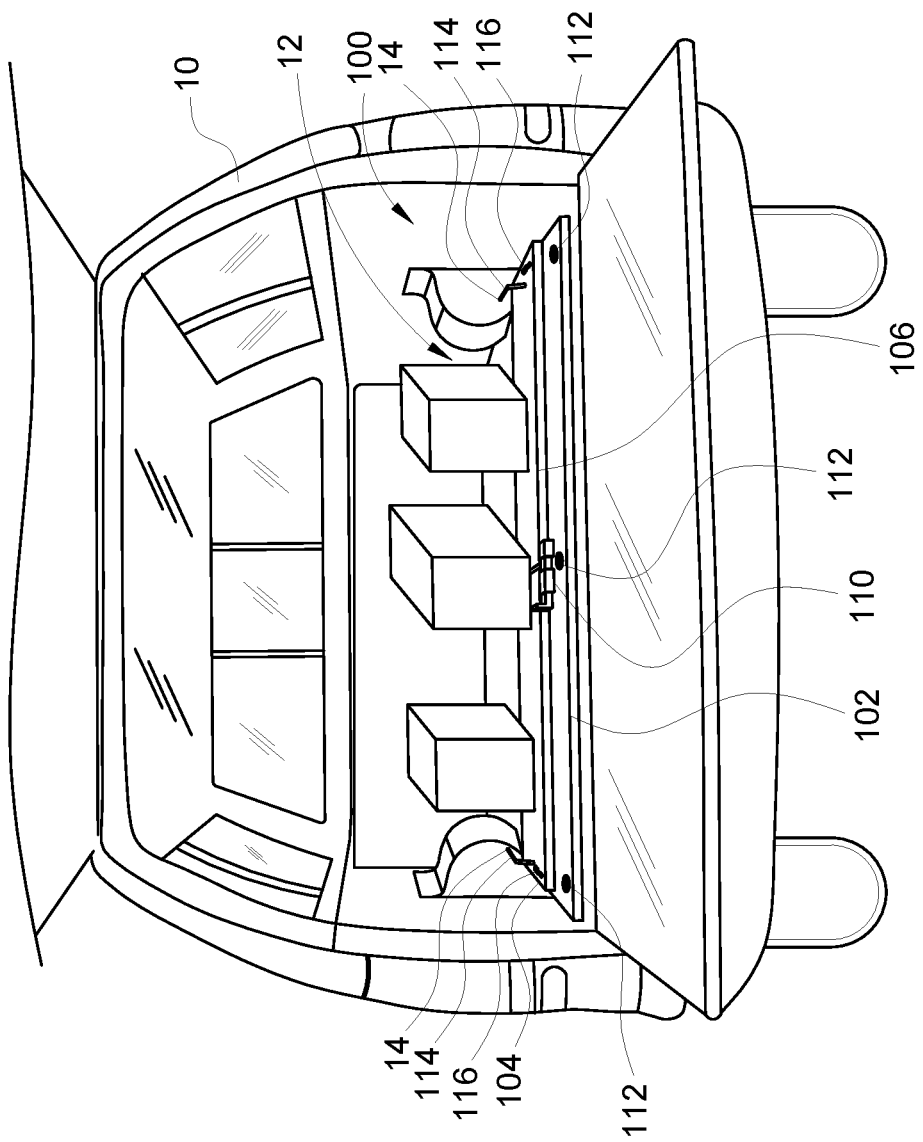
FIG. 4 illustrates a diagrammatic view of the organizer 100 installed in the truck bed 12 while disposed in closed position, in accordance with one or more embodiments of the present invention.

Referring to the drawings, FIGS. 1-2 illustrate diagrammatic views of an organizer (referred by the numeral 100), in accordance with an embodiment of the present invention. Further, FIGS. 3-4 illustrate diagrammatic views of the organizer 100 installed in a vehicle 10. Herein, the organizer 100 is adapted to be installed in the vehicle 10, like that of a pickup truck, such as the pickup truck 10. Although, the illustrated embodiments show the organizer 100 implemented in the pickup truck 10; however, it may be contemplated that the present organizer 100 can be implemented for installation in other type of vehicles, such as a trailer, a van, a cart, a ferry, a passenger car and the like without any limitations. In particular, as shown, the organizer 100 is installed in a truck bed 12 of the pickup truck 10. The organizer 100 of the present disclosure is a strong, rugged, multi-panel divider installed in the pickup truck 10 to store, stabilize, and transport belongings in the truck bed 12.

As shown in FIGS. 3-4, the organizer 100 is generally located towards a rear of the truck bed 12. The organizer 100 is extending and fitted between two lateral sides along a width of the truck bed 12. For this purpose, the organizer 100 is dimensioned to be substantially proportional to the width of the truck bed 12. The organizer 100 may have standard dimensions (as discussed later) based on commonly known dimensions of the truck bed 12 which makes the organizer 100 suitable to be used with most of the common or popular brand and types of pickup trucks. In one or more examples, the organizer 100 of the present disclosure is custom built for each truck bed 12 depending on the shape and dimensions of the truck bed 12.

Referring back to FIG. 1, the organizer 100 includes a base panel 102 which is generally a long extending rectangular sheet of certain thickness. Further, the organizer 100 includes two other panels, a first rear panel 104 and a second rear panel 106. It is to be understood that each of first rear panel 104 and second rear panel 106 may each include a front surface 105 and a rear surface 105a, as best seen in FIG. 1-3. As illustrated, the first rear panel 104 and the second rear panel 106 are also in the form of rectangular sheets. The panels 102, 104 and 106 could be made from plastic, wood, metal, fiberglass or some other suitable material. Typically, each of the panels 102, 104 and 106 have a same thickness for having a plane surface when the organizer 100 is disposed in closed position, and thereby allow for convenient loading and unloading of stored items in and out from the truck bed 12, when the organizer 100 is installed therein (as discussed in more detail in the subsequent paragraphs).

In the organizer 100, the first rear panel 104 and the second rear panel 106 are hingedly connected to the base panel 102. It may be appreciated that the hinged arrangement allows for each of the first rear panel 104 and the second rear panel 106 to be disposed in open positions (i.e. upright position orthogonal to the base panel 102) and closed positions (i.e. laid position parallel to the based panel 102). In particular, the first rear panel 104 and the second rear panel 106 are connected to a rear edge 102a of the base panel 102. For this purpose, multiple hinges 108 are employed. In the present examples, four hinges 108 are provided with two hinges being utilized for connecting each of the first rear panel 104 and the second rear panel 106 to the rear edge 102a of the base panel 102. The utilized two hinges 108 for connecting each of the first rear panel 104 and the second rear panel 106 are generally provided closer to lateral ends of each of the first rear panel 104 and the second rear panel 106. In one or more examples, the utilized hinges 108 are brass hinges which are well known in the art and widely available in the market.

As illustrated, the first rear panel 104 and the second rear panel 106 are arranged side-by-side while coupled to the first panel 102. Such arrangement allows for independent movement or adjustment of the first rear panel 104 and the second rear panel 106 with respect to each other. For example, as depicted in FIG. 1, the first rear panel 104 and the second rear panel 106 are both disposed in open position (i.e. the upright position with respect to the base panel 102) to dispose the organizer 100 in open position. In FIG. 2, the first rear panel 104 and the second rear panel 106 are both disposed in closed position (i.e. the laid position with respect to the base panel 102) to dispose the organizer 100 in closed position. In FIG. 3, in which the organizer 100 is shown installed in the pickup truck 10, the first rear panel 104 is disposed in open position and the second rear panel 106 is disposed in closed position to dispose the organizer 100 in partially open position. Such versatility allows the organizer 100 to be arranged in multiple configurations so as to accommodate items of varying sizes and shapes.

In one or more embodiments, the organizer 100 includes a locking mechanism 110 arranged between the first rear panel 104 and the second rear panel 106. The locking mechanism 110 allows to lock the first rear panel 104 and the second rear panel 106 with respect to each other, such that the movement of the first rear panel 104 and the second rear panel 106 are constrained. Thus allows for simultaneous opening and closing of the panels 104 and 106, to dispose the entire organizer 100 in open or closed position, as required. In the present examples, the locking mechanism 110 may include a barrel bolt, such as a regular barrel bolt, a spring-type regular barrel bolt or a pad-locale barrel bolt as known in the art.

For the purpose of installation of the organizer 100 in the truck bed 12 of the pickup truck 10 (as shown in FIGS. 3-4), the organizer 100 includes self-tapping screws 112 and folding hinges 114. As illustrated better in FIGS. 3-4, the base panel 102 is fixed to the truck bed 12 by means of the self-tapping screws 112. In the present examples, the organizer 100 utilizes three number of self-tapping screws 112 which are generally arranged equidistant and generally closer to a front edge 102b of the base panel 102 and passing through the base panel 102 to be coupled with the truck bed 12. In some examples, the same number of self-tapping screws 112 may also be provided at the rear edge 102a of the base panel 102. It may be appreciated that the use of self-tapping screws 112 allows for removal of the organizer 100 from the truck bed 12 with ease, as and when required.

Further, as illustrated, the organizer 100 may utilize at least two folding hinges 114, with at least one folding hinge 114 provided for each the first rear panel 104 and the second rear panel 106. As best illustrated in FIG. 4, each of the folding hinges 114 are arranged to be in connection with corresponding rear surfaces of the first rear panel 104 and the second rear panel 106 from one ends thereof, and at some connection points, such as connection points 14 (as shown in FIG. 4) in the truck bed 12 from other ends thereof. In other examples, the organizer 100 may also include the folding hinges 114 arranged to be in connection with a corresponding front surfaces of the first rear panel 104 and the second rear panel 106 from one ends thereof, and the base panel 102 from other ends thereof. It may be appreciated that the folding hinges 114 provide support to the first rear panel 104 and the second rear panel 106 when disposed in respective open positions, thus preventing self-collapsing of the panels 104 and 106 from the open positions to the closed positions.

In one or more examples, as illustrated in FIG. 4, the first rear panel 104 and the second rear panel 106 may include handles 116 provided at the rear surface thereof. The handles 116 allow the user to easily lift the corresponding first rear panel 104 and the second rear panel 106, as desired, for disposing the same in open positions. The handles 116 may generally be coupled to the rear surface towards lateral ends of the first rear panel 104 and the second rear panel 106, specifically towards the lateral edges of the truck bed 12, so as not to pose as a restriction while loading and unloading of items in the truck bed 12.

Figure 5:
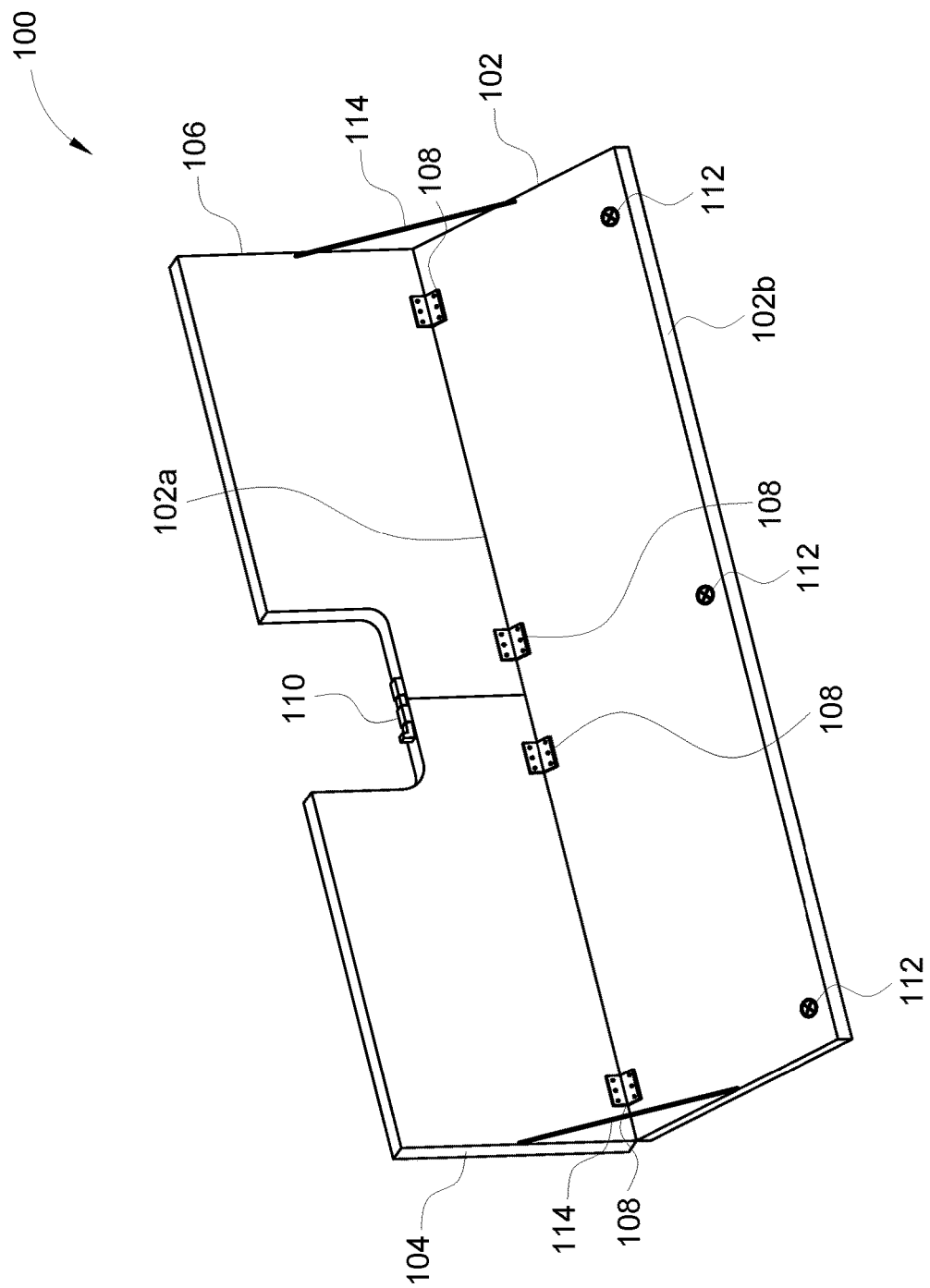
FIG. 5 illustrates a diagrammatic view of the organizer 100, in accordance with another embodiment of the present invention.

FIG. 5 illustrates the organizer 100 in accordance with another embodiment of the present disclosure. As illustrated, the organizer 100 includes a similar base panel 102, and the first rear panel 104 and the second rear panel 106 hingedly coupled to the base panel 102. Herein, the first rear panel 104 and the second rear panel 106 may include a cut portion formed towards and extending along upper edges thereof. Such cut portion may allow for installation of the organizer 100 of FIG. 5 while making space for a fifth wheel as used in some pickup trucks 10 and extending up from the truck bed 12 (when the organizer 100 is in closed position). Such design may also be implemented for arranging a locking member (not shown), like a U-shaped member, for constraining the first rear panel 104 and the second rear panel 106 together.

In one or more embodiments of the present disclosure, the base panel 102 may be about 58 inches long and about 26 inches wide. As discussed above, the base panel 102 is mounted horizontally upon rear of the truck bed 12 using the self-tapping screws 112. In the present examples, the first rear panel 104 and the second rear panel 106 are identical and may each be about 28 inches long and 20 inches wide. Such dimensions of the first rear panel 104 and the second rear panel 106 allows for side-by-side arrangement thereof with respect to the base panel 102. Further, the present organizer 100 may be fitted with about 6 inches folding hinges 114 which are widely available. It may be understood that the given dimensions and configurations are exemplary only and shall not be construed as limiting to the present disclosure.

The organizer 100 helps to keep tools, equipment, and belongings from spilling and rolling around within a wide-open truck bed while also making items much easier to load and unload. The versatile relative arrangement of the first rear panel 104 and the second rear panel 106 allows to fit boxes, in the form of plastic totes or carts, of varying sizes, especially varying depths, as shown in FIGS. 3 and 4. Herein, the boxes may be filled with required tools and items to be stored, and then the panels 104 and 106 may be accordingly independently disposed in open or closed configuration based on the requirements and as per the sizes of the boxes. The illustrated boxes are for representative purposes only and may actually be larger and tightly put together to extend along entire width of the base panel 102. The panels 104 and 106 would serve as upright barriers or walls that keep the boxes from sliding around in the truck bed 12 while driving the pickup truck 10. Further, the user may not need to push the boxes all the way back each time, thus adding to convenience for the user while loading and unloading. The organizer 100 helps to keep the items remain neat, organized and readily accessible in the truck bed 12, while the items are stored in the boxes.

The organizer 100 may further act as a bed liner dimensioned to be received into and operative to cover a portion of the truck bed 12. Thus, the organizer 100 protects the truck bed 12 from damage or defacing when loading, unloading or transporting cargo. Additionally, the organizer 100 is also operative to preserve the truck bed against corrosion due to exposure. Further, in one or more examples, the base panel 102 and the panels 104 and 106 may have high friction surfaces in order to avoid sliding of the boxes placed thereon.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense in any manner.

What is claimed is:

1. An organizer, comprising:
   a vehicle with a truck bed;
   a base panel, said base panel mounted to said truck bed;
   hinges, a first rear panel and a second rear panel mounted to a rear edge of the base panel with said hinges, said hinges being mounted to a front surface of said first and second rear panel and to a top surface of said base panel, wherein the first rear panel and the second rear panel are arranged side-by-side along a length of a rear edge of the base panel; and
   a lock mechanism for constraining the first rear panel and the second rear panel relative to each other for disposing the first rear panel and the second rear panel in open position and closed position independent of each other, said lock mechanism being on a top edge of said first rear panel and said second rear panel; and
   folding hinges, said first rear panel and said second rear panel each having a rear surface, each of said folding hinges having a first end and a second end, said truck bed including connection points, one of said folding hinges mounted to said rear surface of said first rear panel at said first end and to one of the connection points at said second end, another of said folding hinges mounted to said rear surface of said second rear panel at said first end and to another of the connection points at said second end.

2. The organizer of claim 1, wherein the base panel is mounted on the truck bed by means of self-tapping screws.

3. The organizer of claim 1, wherein the locking mechanism includes a barrel bolt.

4. The organizer of claim 1 further including folding hinges, each of said folding hinges having a first end and a second end, one of said folding hinges mounted to said front surface of said first rear panel at said first end and to the base plate at said second end, another of said folding hinges mounted to said front surface of said second rear panel at said first end and to the base plate at said second end.

5. The organizer of claim 1 further including handles provided at a rear surface of the first rear panel and the second rear panel, said handles being parallel to each other, said handles being parallel to lateral edges of said first rear panel and said second rear panel.

6. The organizer of claim 1, wherein the base panel is installed towards a rear of the truck bed.

\* \* \* \* \*